United States Patent
Kobayashi et al.

(10) Patent No.: US 9,688,001 B2
(45) Date of Patent: Jun. 27, 2017

(54) METHOD OF MANUFACTURING TRANSPARENT RESIN COMPOSITION

(71) Applicants: TOSHIBA KIKAI KABUSHIKI KAISHA, Chiyoda-Ku, Tokyo (JP); HSP TECHNOLOGIES INC., Tsukuba-Shi, Ibaraki (JP)

(72) Inventors: Akiyoshi Kobayashi, Fuji (JP); Shigeyuki Fujii, Numazu (JP); Takafumi Sameshima, Fuji (JP); Hiroshi Shimizu, Tsukuba (JP)

(73) Assignees: TOSHIBA KIKAI KABUSHIKI KAISHA, Tokyo (JP); HSP TECHNOLOGIES INC., Tsukuba-Shi (JP)

( * ) Notice: Subject to any disclaimer, the term of this patent is extended or adjusted under 35 U.S.C. 154(b) by 0 days.

(21) Appl. No.: 15/192,359

(22) Filed: Jun. 24, 2016

(65) Prior Publication Data

US 2016/0303766 A1    Oct. 20, 2016

Related U.S. Application Data

(63) Continuation of application No. PCT/JP2014/081584, filed on Nov. 28, 2014.

(30) Foreign Application Priority Data

Dec. 26, 2013  (JP) ................. 2013-268210

(51) Int. Cl.
| | |
|---|---|
| C08L 69/00 | (2006.01) |
| C08L 33/04 | (2006.01) |
| B29B 7/74 | (2006.01) |
| B29B 7/48 | (2006.01) |
| B29B 7/42 | (2006.01) |
| C08L 33/00 | (2006.01) |
| B29B 7/60 | (2006.01) |
| B29B 7/82 | (2006.01) |
| B29C 47/10 | (2006.01) |
| B29C 47/36 | (2006.01) |
| B29C 47/38 | (2006.01) |
| B29C 47/60 | (2006.01) |
| B29K 33/04 | (2006.01) |
| B29K 69/00 | (2006.01) |

(52) U.S. Cl.
CPC ............. *B29B 7/487* (2013.01); *B29B 7/42* (2013.01); *B29B 7/482* (2013.01); *B29B 7/603* (2013.01); *B29B 7/7461* (2013.01); *B29B 7/7485* (2013.01); *B29B 7/82* (2013.01); *C08L 33/00* (2013.01); *C08L 69/00* (2013.01); *B29C 47/1009* (2013.01); *B29C 47/366* (2013.01); *B29C 47/385* (2013.01); *B29C 47/6031* (2013.01); *B29C 47/6037* (2013.01); *B29C 47/6062* (2013.01); *B29K 2033/04* (2013.01); *B29K 2069/00* (2013.01); *B29K 2995/0026* (2013.01)

(58) Field of Classification Search
CPC ...... C08L 69/00; B29B 7/7485; B29B 7/7461
See application file for complete search history.

(56) References Cited

U.S. PATENT DOCUMENTS

| | | | |
|---|---|---|---|
| 5,409,978 A | 4/1995 | Hamada et al. | |
| 2011/0282006 A1 | 11/2011 | Shimizu | |
| 2012/0123056 A1* | 5/2012 | Kobayashi | ........... B29B 7/48 525/148 |

FOREIGN PATENT DOCUMENTS

| | | |
|---|---|---|
| CN | 201077146 Y | 6/2008 |
| CN | 102227293 | 10/2011 |
| CN | 202264380 | 6/2012 |
| CN | 103073867 | 5/2013 |
| JP | 2012-051997 | 3/2012 |
| JP | 2012-167195 | 9/2012 |
| JP | 2012-201832 | 10/2012 |

OTHER PUBLICATIONS

Taiwanese Office Action issued in TW 103145506 on Dec. 29, 2015 with partial English language translation.
English language Abstract and machine Translation of JP 2012-201832 published on Oct. 22, 2012.
English language Abstract and machine Translation of JP 2012-051997 published on Mar. 15, 2012.
English Language Abstract and machine Translation of JP 2012-167195 published on Sep. 6, 2012.
English language Abstract and machine Translation of CN 103073867 published on May 1, 2013.
English language Abstract and machine Translation of CN 201077146Y published on Jun. 25, 2008.
International Search Report issued in PCT/JP2014/081584 on Jan. 6, 2015.
International Preliminary Report on Patentability issued in PCT/JP2014/081584 on Jun. 28, 2016.
Written Opinion (with English Translation) issued in PCT/JP2014/081584 on Jun. 1, 2015.
Chinese Office Action (with English Language Translation) issued in CN Application No. 201480070667.7 dated Feb. 23, 2017.

(Continued)

*Primary Examiner* — David Buttner
(74) *Attorney, Agent, or Firm* — DLA Piper LLP US

(57) ABSTRACT

In a method of manufacturing a transparent resin composition, a molten resin mixture is produced by supplying polycarbonate resin and acrylic resin continuously to a twin-screw extruder. The molten resin mixture is supplied to a single-screw extruder including a screw in which a shear processing portion is provided. Further, a transparent resin composition is produced continuously by kneading the molten resin mixture in the shear processing portion which rotates at between 500 and 4000 rpm.

11 Claims, 3 Drawing Sheets

(56) References Cited

OTHER PUBLICATIONS

English Language Abstract and Translation of CN 102227293 published Oct. 26, 2011.
English Language Abstract and Translation of CN 202264380 published Jun. 6, 2012.

* cited by examiner

METHOD OF MANUFACTURING TRANSPARENT RESIN COMPOSITION

CROSS REFERENCE TO RELATED APPLICATIONS

This application is a Continuation of Application No. PCT/JP2014/081584 filed Nov. 28, 2014, which claims priority from Japanese Patent Application No. 2013-268210, filed Dec. 26, 2013. The entirety of all the above-listed applications are incorporated herein by reference.

BACKGROUND OF THE INVENTION

1. Field of the Invention

Embodiments described herein relate generally to a method of manufacturing a transparent resin composition containing polycarbonate resin and acrylic resin.

2. Description of the Related Art

Polycarbonate resin is excellent in transparency, dimensional stability and resistance to impact, and has thus been conventionally used in various applications, such as automobiles, electronic devices and houses. However, although the resin has excellent characteristics as described above, it is inferior in surface hardness and resistance to ultraviolet light. In consideration of these deficiencies, research and development with respect to mixing the resin with acrylic resin has been promoted.

Patent literature 1 discloses a technique for obtaining transparent resin materials by kneading raw materials of polycarbonate resin and methacrylic resin with a high-shear processing device comprising an internal feedback-type screw.

In this prior art, raw materials of polycarbonate resin and methacrylic resin are melted and kneaded near their melting point at 200 to 240° C. By this kneading, the dispersal phase of methacrylic resin having a diameter of 300 nm or less, preferably 100 nm or less, is nano-dispersed into the polycarbonate matrix phase uniformly and densely. Thus, the kneaded resin materials become transparent.

The patent literature further discloses the following technical matters. When raw materials are mixed using a twin-screw melting/kneading device, the dispersal phase is larger than the wavelength of the visible range. Thus, the kneaded resin materials are not transparent, and become whitish.

CITATION LIST

Patent Literature

Patent Literature 1
WO 2010/061872

BRIEF SUMMARY OF THE INVENTION

Technical Problem

The high-shear processing device comprising the internal feedback-type screw disclosed in patent literature 1 is a batch-type processing device, and the kneaded resin materials cannot be extracted continuously. Moreover, it takes two minutes to knead two to five grams of raw materials. Thus, the productivity is poor in comparison with conventional continuous manufacturing devices such as extruders. In reality, it is difficult to apply the high-shear processing device disclosed in patent literature 1 to a production line used for continuously manufacturing resin products.

Embodiments described herein aim to obtain a method of manufacturing a transparent resin composition of polycarbonate resin and acrylic resin continuously and efficiently.

Means for Solving Problem

According to an embodiment, to achieve the object, a method of manufacturing a transparent resin composition comprises:

continuously supplying polycarbonate resin in which an amount supplied per unit time is set to 95 to 60% by weight, and acrylic resin in which an amount supplied per unit time is set to 5 to 40% by weight, to a twin-screw extruder in which two first screws engaging with each other rotate in a same direction at no more than 600 rpm;

producing a molten resin mixture by melting and mixing the polycarbonate resin and the acrylic resin in the twin-screw extruder, and discharging the molten resin mixture continuously from the twin-screw extruder;

continuously supplying the molten resin mixture discharged from the twin-screw extruder to a single-screw extruder, the single-screw extruder comprising a second screw and a cylinder in which the second screw is accommodated, the second screw comprising a feed flight from a base end portion to an apical end portion, and a shear processing portion in an intermediate portion;

producing a transparent resin composition by kneading the molten resin mixture in the shear processing portion which rotates at between 500 and 4000 rpm with the second screw; and discharging the transparent resin composition continuously from the single-screw extruder.

Effect of Invention

According to the embodiments of the present invention, it is possible to produce a transparent resin composition of polycarbonate resin and acrylic resin continuously and efficiently. Thus, the embodiments can be applied to a production line which manufactures resin products continuously.

DETAILED DESCRIPTION OF THE INVENTION

The first embodiment of the present invention is explained below with reference to FIG. 1 to FIG. 3.

Figure 1:
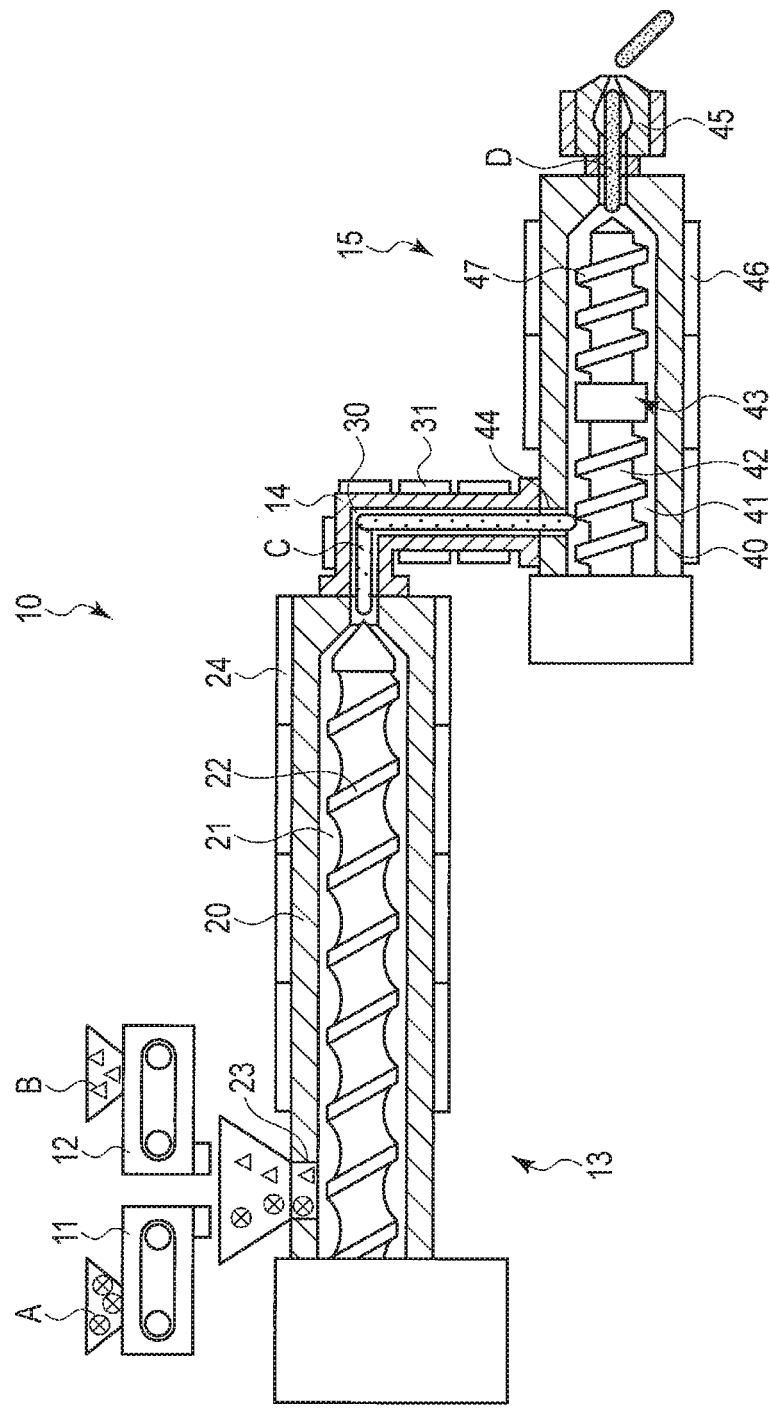
FIG. 1 is a cross-sectional view schematically showing a manufacturing device used in a manufacturing method in the present invention.

FIG. 1 schematically shows a manufacturing device 10 which is used when a method of manufacturing a transparent resin composition is implemented in the present invention. The manufacturing device 10 comprises a first raw material feeder 11, a second raw material feeder 12, a twin-screw extruder 13, a single tube 14 and a single-screw extruder 15.

The first raw material feeder 11 is an element which supplies polycarbonate resin A continuously. In the present embodiment, the amount of polycarbonate resin A supplied per unit time is set in the range of 95 to 60% by weight. The second raw material feeder 12 is an element which supplies acrylic resin B continuously. In the present embodiment, the amount of acrylic resin B supplied per unit time is set in the range of 5 to 40% by weight. The twin-screw extruder 13 is an element which produces a molten resin mixture C by continuously melting and mixing the polycarbonate resin A supplied from the first raw material feeder 11 and the acrylic resin B supplied from the second raw material feeder 12. The produced molten resin mixture C is continuously discharged from the twin-screw extruder 13. The single tube 14 is structured such that the molten resin mixture C discharged from the twin-screw extruder 13 passes through the single tube 14. The single-screw extruder 15 is an element which produces a transparent resin composition D by continuously kneading the molten resin mixture C supplied from the single tube 14. The produced transparent resin composition D is continuously discharged from the single-screw extruder 15.

As shown in FIG. 1, the twin-screw extruder 13 comprises a barrel 20, and two first screws 22 (only one first screw is shown in the figure) inserted into a cylinder 21 inside the barrel 20. The first screws 22 rotate in the same direction while they engage with each other in the cylinder 21. A raw material feed opening 23 is provided at an end of the barrel 20 in the longitudinal direction. The raw material feed opening 23 communicates with the cylinder 21 at a position corresponding to the base end portion side of the first screws 22.

Polycarbonate resin A is supplied continuously from the first raw material feeder 11 to the cylinder 21 through the raw material feed opening 23. Similarly, acrylic resin B is supplied continuously from the second raw material feeder 12 to the cylinder 21 through the raw material feed opening 23.

The barrel 20 has the other end located on the apical end portion side of the first screws 22. The single tube 14 is connected to the other end of the barrel 20. A heater 24 which heats the barrel 20 is attached to the outer circumferential portion of the barrel 20.

The first screws 22 are rotated by the torque from a drive motor (not shown). The polycarbonate resin A and acrylic resin B supplied from the raw material feed opening 23 to the cylinder 21 are delivered continuously from the base end portion to the apical end portion of the first screws 22 in connection with the rotation of the first screws 22.

In other words, the polycarbonate resin A and the acrylic resin B pass through the cylinder 21 from an end to the other end of the cylinder 21. At this time, the polycarbonate resin A and the acrylic resin B are stirred by the rotated first screws 22, and are heated by the heater 24. As a result, the polycarbonate resin A and the acrylic resin B are melted and mixed to become a molten resin mixture C.

The molten resin mixture C which is discharged continuously from the twin-screw extruder 13 passes through a passage 30 inside the single tube 14, and is supplied to the single-screw extruder 15. A heater 31 is attached to the outer circumference of the single tube 14. The heater 31 heats the single tube 14 such that the molten resin mixture C maintains its molten state.

As shown in FIG. 1, the single-screw extruder 15 comprises a barrel 40 and a second screw 42 inserted into a cylinder 41 inside the barrel 40. A resin feed opening 44 is provided at an end of the barrel 40 in the longitudinal direction. The resin feed opening 44 communicates with the cylinder 41 at a position corresponding to the base end portion side of the second screw 42. The downstream end of the passage 30 of the single tube 14 is connected to the resin feed opening 44 of the barrel 40. Thus, the molten resin mixture C which passes through the passage 30 of the single tube 14 is supplied continuously from the resin feed opening 44 to the cylinder 41.

Further, the barrel 40 has the other end located on the apical end portion side of the second screw 42. A die 45 is provided at the other end of the barrel 40. A heater 46 which heats the cylinder 41 is attached to the outer circumference of the barrel 40.

Figure 2:
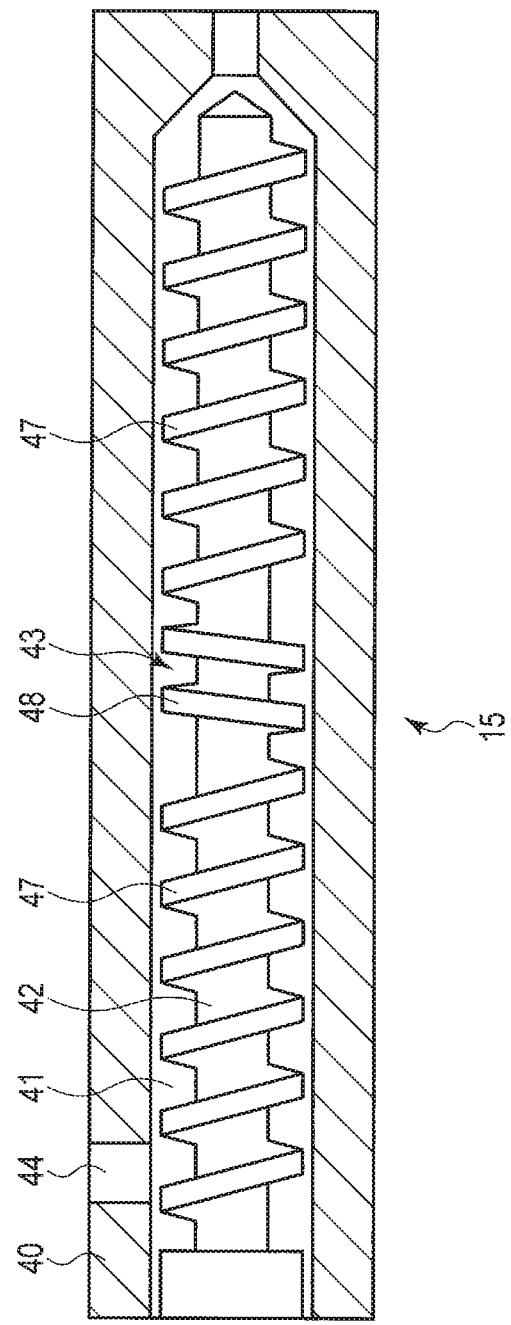
FIG. 2 is a cross-sectional view schematically showing a single-screw extruder used in the manufacturing method in the present invention.

FIG. 2 schematically shows the second screw 42 of the single-screw extruder 15. The second screw 42 is rotated by the torque from a drive motor (not shown). As shown in FIG. 2, the second screw 42 comprises a shear processing portion 43 in the intermediate portion in the longitudinal direction of the second screw 42. A feed flight 47 is formed between the base end portion of the second screw 42 and the shear processing portion 43 and between the shear processing portion 43 and the apical end portion of the second screw 42. In the feed flight 47, the external diameter including the thread crest and the root diameter are set to constant values.

The shear processing portion 43 comprises a backward feed flight 48. The backward feed flight 48 twists in a direction opposite to the direction in which the feed flight 47 twists. The backward feed flight 48 is formed continuously in the axial direction of the second screw 42. In the backward feed flight 48, the number of ridges is, for example, greater than or equal to two, and less than or equal to five. No groove or cutout is present between an end and the other end of the backward feed flight 48. Thus, the backward feed flight 48 is formed continuously and uniformly.

In the first embodiment, the molten resin mixture C which is supplied continuously from the single tube 14 to the cylinder 41 through the resin feed opening 44 of the barrel 40 is delivered from the base end portion of the second screw 42 to the shear processing portion 43 in connection with the rotation of the second screw 42. The molten resin mixture C which reached the shear processing portion 43 passes between the inner circumferential wall of the cylinder 41 and the outer circumferential portion of the backward feed flight 48. At this time, the molten resin mixture C is kneaded by a shear action. The acrylic resin B is dispersed into the polycarbonate resin A uniformly and densely. As a result, a transparent resin composition D containing the polycarbonate resin A and the acrylic resin B is produced.

The produced transparent resin composition D is delivered from the shear processing portion 43 to the apical end portion of the second screw 42, and is discharged to the die 45 connected to the other end of the barrel 40. The die 45 applies incorporation to the transparent resin composition D to shape the transparent resin composition D in a predetermined form. The shaped transparent resin composition D is extruded from the die 45 as a product.

Figure 3:
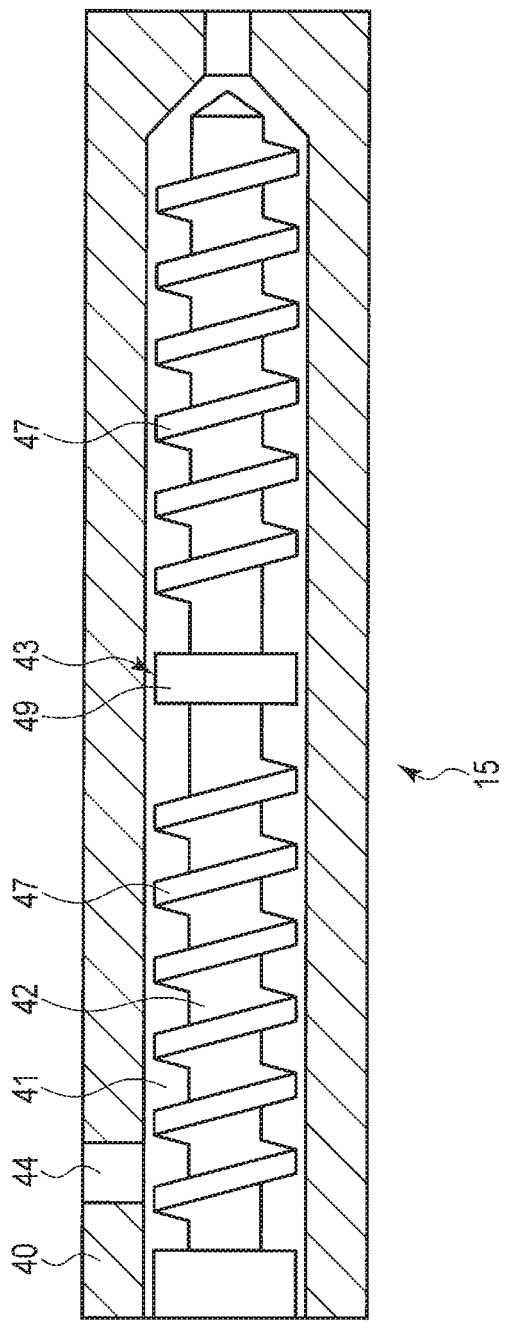
FIG. 3 is a cross-sectional view schematically showing another embodiment of the single-screw extruder used in the manufacturing method in the present invention.

FIG. 3 schematically shows a second screw 42 of a single-screw extruder 15 according to the second embodiment. The second screw 42 differs from that of the first embodiment in terms of the form of a shear processing portion 43. The other structures of the second screw 42 are the same as those of the first embodiment.

As shown in FIG. 3, the shear processing portion 43 comprises an annular protrusion 49. The protrusion 49 protrudes concentrically in the radial direction of the second screw 42, and is formed continuously in the circumferential direction of the second screw 42. Specifically, the protrusion 49 is formed in the second screw 42 as a continuous integrated structure which does not have a groove or cutout on the outer circumferential surface.

In the second embodiment, the molten resin mixture C which is supplied continuously from a single tube 14 to a cylinder 41 through a resin feed opening 44 of a barrel 40 is delivered from the base end portion of the second screw 42 to the shear processing portion 43 in connection with the rotation of the second screw 42. The molten resin mixture C which reached the shear processing portion 43 passes between the inner circumferential wall of the cylinder 41 and the outer circumferential surface of the protrusion 49. At this time, the molten resin mixture C is kneaded by a shear action. The acrylic resin B is dispersed into the polycarbonate resin A uniformly and densely. As a result, a transparent resin composition D containing the polycarbonate resin A and the acrylic resin B is produced.

The produced transparent resin composition D is delivered from the shear processing portion 43 to the apical end portion of the second screw 42, and is discharged to a die 45 connected to the other end of the barrel 40. The die 45 applies incorporation to the transparent resin composition D to shape the transparent resin composition D in a predetermined form. The shaped transparent resin composition D is extruded from the die 45 as a product.

In the first and second embodiments, the outer diameter of the second screw 42 of the single-screw extruder 15 is greater than that of the first screws 22 of the twin-screw extruder 13. Moreover, the shear processing portion 43 is not limited to the structure in which the shear processing portion 43 is provided at only one position of the intermediate portion of the second screw 42. For example, a plurality of shear processing portions 43 may be arranged in the axial direction of the second screw 42 depending on the state of kneading.

Now, this specification explains a method of manufacturing a transparent resin composition D.

As a raw material, polycarbonate resin A is put into the first raw material feeder 11 of the manufacturing device 10. Similarly, as a raw material, acrylic resin B is put into the second raw material feeder 12 of the manufacturing device 10. The first raw material feeder 11 measures the polycarbonate resin A such that the amount of polycarbonate resin A supplied per unit time is in the range of 95 to 60% by weight. The first raw material feeder 11 supplies the polycarbonate resin A to the cylinder 21 of the twin-screw extruder 13 continuously. Similarly, the second raw material feeder 12 measures the acrylic resin B such that the amount of acrylic resin B supplied per unit time is in the range of 5 to 40% by weight. The second raw material feeder 12 supplies the acrylic resin B to the cylinder 21 of the twin-screw extruder 13 continuously.

The polycarbonate resin A and the acrylic resin B supplied to the cylinder 21 are delivered from an end to the other end of the cylinder 21 by the first screws 22 which rotate while they engage with each other. During this delivering, the polycarbonate resin A and the acrylic resin B are melted and mixed. When the polycarbonate resin A and the acrylic resin B are delivered, the temperature of the barrel 20 is set to 240 to 300° C., and the rate of rotation of the first screws 22 is set to 50 to 600 rpm.

The twin-screw extruder 13 produces a liquid-phase molten resin mixture C continuously from solid-phase polycarbonate resin A and solid-phase acrylic resin B. At this point, the acrylic resin B is not dispersed into the polycarbonate resin A uniformly or densely. Thus, the molten resin mixture C is whitish.

The molten resin mixture C discharged from the twin-screw extruder 13 is supplied to the single-screw extruder 15 through the passage 30 of the single tube 14 without contact with air. The single tube 14 is heated by the heater 31 such that the molten resin mixture C maintains its molten state. The heating temperature of the single tube 14 by the heater 31 is preferably set to 220 to 280° C.

The molten resin mixture C whish is supplied continuously from the single tube 14 to the cylinder 41 of the single-screw extruder 15 is delivered from the base end potion of the second screw 42 to the shear processing portion 43 by the rotated second screw 42. At this time, the temperature of the cylinder 41 is set to 220 to 280° C., and the rate of rotation of the second screw 42 is set to 500 to 4000 rpm.

In the present embodiment, the rate of rotation of the second screw 42 of the single-screw extruder 15 with an outer diameter greater than that of the first screws 22 of the twin-screw extruder 13 is set to 500 to 4000 rpm. Thus, the molten resin mixture C which is supplied continuously from the resin feed opening 44 to the cylinder 41 is delivered to the shear processing portion 43 without being filled in the intervals of the feed flight 47 of the second screw 42. Moreover, since the outer diameter and the root diameter of the feed flight 47 are defined as constant values, the molten resin mixture C supplied to the cylinder 41 is transferred to the shear processing portion 43 in a stable state.

The molten resin mixture C which reached the shear processing portion 43 passes between the outer circumferential portion of the shear processing portion 43 and the inner circumferential wall of the cylinder 41. At this time, the shear processing portion 43 rotates at 500 to 4000 rpm faster than the screw of a single-screw extruder used in common extrusion molding. Thus, the molten resin mixture C which passes between the outer circumferential portion of the shear processing portion 43 and the inner circumferential wall of the cylinder 41 is kneaded with a powerful shear action in a short time.

As a result, the acrylic resin B is dispersed into the polycarbonate resin A uniformly and densely. In this manner, a transparent resin composition D containing the polycarbonate resin A and the acrylic resin B is produced.

The produced transparent resin composition D is delivered to the apical end portion of the second screw 42 stably by the feed flight 47 having a constant outer diameter and a constant root diameter, and is subjected to incorporation by the die 45. Thus, a product which is shaped in a desired form can be obtained without cutting the transparent resin composition D. The product is extruded from the die 45.

In the manufacturing method of the present embodiment, the twin-screw extruder 13 which is the former part of the manufacturing device 10 melts and mixes polycarbonate resin A and acrylic resin B. The single-screw extruder 15 which is the latter part kneads polycarbonate resin A and acrylic resin B, applying a shear action. Thus, manufacturing conditions including the rate of rotation of the first screws 22 for melting and mixing can be set separately from manufacturing conditions including the rate of rotation of the second screw 42 for applying a powerful shear action in a short time in association with each other. In this manner, a transparent resin composition D containing polycarbonate resin A and acrylic resin B can be produced stably and continuously.

Now, this specification looks at example 1, example 2 and a comparative example.

EXAMPLE 1

To implement the manufacturing method of the present embodiment, a TEM-18SS twin-screw extruder manufactured by Toshiba Machine Co., Ltd. was employed as the twin-screw extruder 13 which functions as the former part of the manufacturing device 10. In the TEM-18SS twin-screw extruder, the nominal diameter of the outer diameter of the first screws 22 was set to 18 mm. An SE-36SP single-screw extruder manufactured by Toshiba Machine Co., Ltd. was employed as the single-screw extruder which functions as the latter part of the manufacturing device 10. In the SE-36SP single-screw extruder, the nominal diameter of the outer diameter of the second screw 42 was set to 36 mm. Further, the TEM-18SS twin-screw extruder was connected to the SE-36SP single-screw extruder by the single tube 14.

In the first screws 22 of the twin-screw extruder 13, the length (effective length) of the first screws 22 relative to the outer diameter of the first screws 22 was 48. In the second screw 42 of the single-screw extruder 15, the length (effective length) of the second screw 42 relative to the outer diameter of the second screw 42 was 8. Further, as the shear processing portion 43, the backward feed flight 48 was provided at two positions away from each other in the longitudinal direction of the second screw 42. The length of the gap between the inner circumferential wall of the cylinder 41 and the outer circumferential portion of the backward feed flights 48 was set to 0.3 mm. The temperature of the barrel 20 of the twin-screw extruder 13, the temperature of the barrel 40 of the single-screw extruder 15, and the temperature of the single tube 14 were set to 260° C.

As the polycarbonate resin A to be supplied to the twin-screw extruder 13, Panlite L-1250Y manufactured by Teijin Limited was used. As the acrylic resin B to be supplied to the twin-screw extruder 13, Acrypet VH001 manufactured by Mitsubishi Rayon Co., Ltd. was used. Polycarbonate resin A was supplied at a rate of 8 kg per hour from the first raw material feeder 11 to the cylinder 21 of the twin-screw extruder 13. Acrylic resin B was supplied at a rate of 2 kg per hour from the second raw material feeder 12 to the cylinder 21 of the twin-screw extruder 13. In this state, the polycarbonate resin A and the acrylic resin B were melted and mixed at 200 rpm as the rate of rotation of the first screws 22. In this manner, a molten resin mixture C was produced.

Further, the molten resin mixture C was kneaded in a state where the rate of rotation of the second screw 42 of the single-screw extruder 15 was set to 2800 rpm. Resin compositions containing the polycarbonate resin A and the acrylic resin B were obtained at a rate of 10 kg per hour (approximately 167 g per minute) by the die 45. When the obtained resin compositions were visually inspected, the compositions were found to be not whitish but transparent.

EXAMPLE 2

In example 2, the molten resin mixture C was kneaded, using the single-screw extruder 15 comprising the second screw 42 in which the form of the shear processing portion 43 was different. The shear processing portion 43 had the annular protrusion 49 at two positions away from each other in the longitudinal direction of the second screw 42. Except for the single-screw extruder 15, the structures of the manufacturing device 10 were the same as those of example 1.

In example 2, polycarbonate resin A was supplied at a rate of 8 kg per hour from the first raw material feeder 11 to the cylinder 21 of the twin-screw extruder 13. Acrylic resin B was supplied at a rate of 2 kg per hour from the second raw material feeder 12 to the cylinder 21 of the twin-screw extruder 13. In this state, the polycarbonate resin A and the acrylic resin B were melted and mixed at 200 rpm as the rate of rotation of the first screws 22. In this manner, the molten resin mixture C was produced.

Further, the molten resin mixture C was kneaded in a state where the rate of rotation of the second screw 42 of the single-screw extruder 15 was set to 2800 rpm. Resin compositions containing the polycarbonate resin A and the acrylic resin B were obtained at a rate of 10 kg per hour (approximately 167 g per minute) by the die 45. When the obtained resin compositions were visually inspected, the compositions were found to be not whitish but transparent.

COMPARATIVE EXAMPLE 1

In comparative example 1, a TEM-18SS twin-screw extruder manufactured by Toshiba Machine Co., Ltd. was employed. In the TEM-18SS twin-screw extruder, the nominal diameter of the outer diameter of the screws was set to 18 mm. A kneading disk was provided in each of the two screws which engaged with each other in the twin-screw extruder.

The molten resin mixture which was extruded from the twin-screw extruder and contained polycarbonate resin and acrylic resin was observed while the rate of rotation of the screws was changed in the range of 300 to 1200 rpm. As a result, the molten resin mixture extruded from the twin-screw extruder was whitish at any time. Thus, the molten resin mixture was not transparent.

In the comparative example, the twin-screw extruder generated abnormal noise and oscillation when the rate of rotation of the screws reached 1200 rpm. It was revealed that the abnormal noise or oscillation was generated because the polycarbonate resin and the acrylic resin reached the kneading disks of the screws in a state where preheating was insufficient. Moreover, a significant reduction in the viscosity was observed in the molten resin mixture produced by the twin-screw extruder. Thus, the operation of the twin-screw extruder was stopped when the rate of rotation exceeded 1200 rpm.

The comparison between example 1, example 2 and comparative example 1 shows that the resin composition which was produced continuously by the manufacturing method of the present embodiment and contained polycarbonate resin and acrylic resin was not whitish, and was transparent. Further, it was found that the acrylic resin was dispersed into the polycarbonate resin uniformly and densely.

REFERENCE SIGNS LIST

10 Manufacturing device
13 Twin-screw extruder
15 Single-screw extruder
22 First screw
41 Cylinder
42 Second screw
43 Shear processing portion
47 Flight
A Polycarbonate resin
B Acrylic resin
C Molten resin mixture
D Transparent resin composition

What is claimed is:
1. A method of manufacturing a transparent resin composition containing polycarbonate resin and acrylic resin, the method comprising:
continuously supplying the polycarbonate resin in which an amount supplied per unit time is set to 95 to 60% by weight, and acrylic resin in which an amount supplied per unit time is set to 5 to 40% by weight, to a twin-screw extruder in which two first screws engaging with each other rotate in a same direction at no more than 600 rpm;

producing a molten resin mixture by melting and mixing the polycarbonate resin and the acrylic resin in the twin-screw extruder, and discharging the molten resin mixture continuously from the twin-screw extruder;

continuously supplying the molten resin mixture discharged from the twin-screw extruder to a single-screw extruder, the single-screw extruder comprising a second screw and a cylinder in which the second screw is accommodated, the second screw comprising a feed flight from a base end portion to an apical end portion, and a shear processing portion in an intermediate portion;

producing a transparent resin composition by kneading the molten resin mixture in the shear processing portion which rotates at between 500 and 4000 rpm with the second screw; and discharging the produced transparent resin composition continuously from the single-screw extruder.

2. The method of claim 1, wherein
the shear processing portion comprises a backward feed flight which twists in a direction opposite to a direction in which the feed flight twists, and
when the molten resin mixture delivered by the second screw passes through a gap between an inner circumferential wall of the cylinder and an outer circumferential portion of the backward feed flight, the molten resin mixture is kneaded.

3. The method of claim 2, wherein
a shear action is applied to the molten resin mixture when the molten resin mixture passes through the gap between the inner circumferential wall of the cylinder and the outer circumferential portion of the backward feed flight.

4. The method of claim 1, wherein
the shear processing portion comprises an annular protrusion which protrudes concentrically in a radial direction of the second screw, the protrusion being formed continuously in a circumferential direction of the second screw, and
when the molten resin mixture delivered by the second screw passes through a gap between an inner circumferential wall of the cylinder and an outer circumferential portion of the protrusion, the molten resin mixture is kneaded.

5. The method of claim 4, wherein
a shear action is applied to the molten resin mixture when the molten resin mixture passes through the gap between the inner circumferential wall of the cylinder and the outer circumferential portion of the protrusion.

6. The method of claim 1, wherein
an outer diameter and a root diameter of the feed flight of the single-screw extruder are set constantly, and
the feed flight of the single-screw extruder delivers the molten resin mixture supplied from the twin-screw extruder from a base end portion of the screw to the shear processing portion, and delivers the transparent resin composition produced by the shear processing portion from the shear processing portion to the apical end portion of the screw.

7. The method of claim 1, wherein
an outer diameter of the second screw is greater than an outer diameter of the first screw, and
the molten resin mixture delivered by the second screw is delivered to the shear processing portion without being filled in intervals of the feed flight of the second screw.

8. The method of claim 2, wherein
an outer diameter and a root diameter of the feed flight of the single-screw extruder are set constantly, and
the feed flight of the single-screw extruder delivers the molten resin mixture supplied from the twin-screw extruder from a base end portion of the screw to the shear processing portion, and delivers the transparent resin composition produced by the shear processing portion from the shear processing portion to the apical end portion of the screw.

9. The method of claim 3, wherein
an outer diameter and a root diameter of the feed flight of the single-screw extruder are set constantly, and
the feed flight of the single-screw extruder delivers the molten resin mixture supplied from the twin-screw extruder from a base end portion of the screw to the shear processing portion, and delivers the transparent resin composition produced by the shear processing portion from the shear processing portion to the apical end portion of the screw.

10. The method of claim 4, wherein
an outer diameter and a root diameter of the feed flight of the single-screw extruder are set constantly, and
the feed flight of the single-screw extruder delivers the molten resin mixture supplied from the twin-screw extruder from a base end portion of the screw to the shear processing portion, and delivers the transparent resin composition produced by the shear processing portion from the shear processing portion to the apical end portion of the screw.

11. The method of claim 5, wherein
an outer diameter and a root diameter of the feed flight of the single-screw extruder are set constantly, and
the feed flight of the single-screw extruder delivers the molten resin mixture supplied from the twin-screw extruder from a base end portion of the screw to the shear processing portion, and delivers the transparent resin composition produced by the shear processing portion from the shear processing portion to the apical end portion of the screw.

* * * * *